United States Patent [19]
Breed

[11] Patent Number: 6,088,640
[45] Date of Patent: Jul. 11, 2000

[54] APPARATUS FOR DETERMINING THE LOCATION OF A HEAD OF AN OCCUPANT IN THE PRESENCE OF OBJECTS THAT OBSCURE THE HEAD

[75] Inventor: David S. Breed, Boonton Township, Morris County, N.J.

[73] Assignee: Automotive Technologies International, Inc., Denville, N.J.

[21] Appl. No.: 08/992,525

[22] Filed: Dec. 17, 1997

[51] Int. Cl.[7] .............................. G06F 13/10; B60R 21/28
[52] U.S. Cl. ........................... 701/45; 280/735; 280/753; 296/65.01; 297/216.12; 297/408; 701/49
[58] Field of Search ................................ 297/391, 216.12, 297/408; 296/65.01; 280/728.1, 730.1, 735, 753; 180/167, 268, 272; 701/45, 49

[56] References Cited

U.S. PATENT DOCUMENTS

| | | | |
|---|---|---|---|
| 3,275,975 | 9/1966 | King | 180/272 |
| 3,838,870 | 10/1974 | Hug | 297/384 |
| 4,519,652 | 5/1985 | Kamijo | 180/268 |
| 4,645,233 | 2/1987 | Bruse et al. | 297/410 |
| 4,797,824 | 1/1989 | Sugiyama et al. | 364/424.05 |
| 4,811,226 | 3/1989 | Shinohara | 364/424.05 |
| 4,853,687 | 8/1989 | Isomura et al. | 364/424.05 |
| 4,935,680 | 6/1990 | Sugiyama | 364/424.05 |
| 4,995,639 | 2/1991 | Breed | 280/735 |
| 5,003,240 | 3/1991 | Ikeda | 364/424.05 |
| 5,006,771 | 4/1991 | Ogasawara | 318/568.1 |
| 5,008,946 | 4/1991 | Ando | 180/167 |
| 5,071,160 | 12/1991 | White et al. | 280/735 |
| 5,074,583 | 12/1991 | Fujita et al. | 280/735 |
| 5,095,257 | 3/1992 | Ikeda et al. | 364/424.05 |
| 5,151,944 | 9/1992 | Yamamura et al. | 381/151 |
| 5,161,820 | 11/1992 | Vollmer | 280/730.1 |
| 5,181,763 | 1/1993 | Dellanno et al. | 297/391 |
| 5,290,091 | 3/1994 | Dellanno et al. | 297/408 |
| 5,330,226 | 7/1994 | Gentry et al. | 280/735 |
| 5,364,164 | 11/1994 | Kuranami | 297/408 |
| 5,378,043 | 1/1995 | Viano et al. | 297/408 |
| 5,580,124 | 12/1996 | Dellanno | 297/216.12 |
| 5,694,320 | 12/1997 | Breed | 364/424.05 |
| 5,748,473 | 5/1998 | Breed et al. | 701/45 |
| 5,822,707 | 10/1998 | Breed et al. | 701/49 |

FOREIGN PATENT DOCUMENTS

| | | |
|---|---|---|
| 2301906 | 12/1996 | United Kingdom . |
| 94/22693 | 10/1994 | WIPO . |

OTHER PUBLICATIONS

Viano, David C. & Gargan, Martin F., "Headrest Position During Normal Driving, Implication to Neck Injury Risk in Rear Crashes", Acad. Anal. And Prev., vol. 28, No. 6, pp. 665–674 Elsevier Science, Ltd.

*Primary Examiner*—William A. Cuchlinski, Jr.
*Attorney, Agent, or Firm*—Brian Roffe

[57] ABSTRACT

A headrest and headrest positioning system reduces whiplash injuries from rear impacts by properly positioning the headrest behind the occupant's head either continuously, or just prior to and in anticipation of, the vehicle impact and then properly supports both the head and neck. Sensors determine the location of the occupant's head and motors move the headrest both up and down and forward and back as needed. In one implementation, the headrest is continuously adjusted to maintain a proper orientation of the headrest to the rear of the occupant's head. In another implementation, an anticipatory crash, is used to predict that a rear impact is about to occur, in which event, the headrest is moved proximate to the occupant. A pre-inflated airbag within the headrest automatically distributes the pressure to evenly support both the head and neck.

19 Claims, 10 Drawing Sheets

APPARATUS FOR DETERMINING THE LOCATION OF A HEAD OF AN OCCUPANT IN THE PRESENCE OF OBJECTS THAT OBSCURE THE HEAD

CROSS REFERENCE TO RELATED APPLICATIONS

This application is related to U.S. patent application Ser. No. 08/476,882 filed Jun. 7, 1995 now U.S. Pat. No. 5,694,320.

FIELD OF THE INVENTION

The present invention is related to apparatus for determining the location of an occupant's head in the presence of objects that obscure the same and a movable headrest for a seat in a vehicle.

BACKGROUND OF THE INVENTION

Approximately 100,000 rear impacts per year result in whiplash injuries to the vehicle occupants. Most of these injuries could be prevented if the headrest were properly positioned behind the head of the occupant and if it had the correct contour to properly support the head and neck of the occupant. Whiplash injuries are the most expensive automobile accident injury even though these injuries are usually are not life threatening and are usually classified as minor.

A good discussion of the causes of whiplash injuries in motor vehicle accidents can be found in Dellanno et al U.S. Pat. Nos. 5,181,763 and 5,290,091 which are included herein by reference, as well as many other technical papers. These patents discuss a novel automatic adjustable headrest to minimize such injuries. However, these patents assume that the headrest is properly positioned relative to the head of the occupant. A survey has shown that as many as 95% of automobiles do not have the headrest properly positioned. These patents also assume that all occupants have approximately the same contour of the neck and head. Observations of humans, on the other hand, show that significant differences occur where the back of some people's heads is almost in the same plane as the that of their neck and shoulders, while other people have substantially the opposite case, that is, their neck extends significantly forward of their head back and shoulders.

One proposed attempt at solving the problem where the headrest is not properly positioned uses a conventional crash sensor which senses the crash after impact and a headrest composed of two portions, a fixed portion and a movable portion. During a rear impact, a sensor senses the crash and pyrotechnically deploys a portion of the headrest toward the occupant. This system has the following potential problems:

1) An occupant can get a whiplash injury in fairly low velocity rear impacts, thus, either the system will not protect occupants in such accidents or there will be a large number of low velocity deployments with the resulting significant repair expense.

2) If the portion of the headrest which is propelled toward the occupant has significant mass, that is if it is other than an airbag type device, there is a risk that it will injure the occupant. This is especially true if the system has no method of sensing and adjusting for the position of the occupant.

3) If the system does not also have a system which pre-positions the headrest to the proximity of the occupants head, it will also not be affective when the occupant's head is forward due to pre-crash braking, for example, or for different sized occupants.

A variation of this approach uses an airbag positioned in the headrest which is activated by a rear impact crash sensor. This system suffers the same problems as the pyrotechnically deployed headrest portion. Unless the headrest is pre-positioned, there is a risk for the out-of-position occupant.

SUMMARY OF THE INVENTION

A headrest and headrest positioning system in accordance with this invention reduces whiplash injuries from rear impacts by properly positioning the headrest behind the occupant's head either continuously, or just prior to and in anticipation of, the vehicle impact and then properly supports both the head and neck. Sensors determine the location of the occupant's head and motors move the headrest both up and down and forward and back as needed. In one implementation, the headrest is continuously adjusted to maintain a proper orientation of the headrest to the rear of the occupant's head. In another implementation, an anticipatory crash sensor, such as described in copending patent application Ser. No. 08/247,760 filed May 23, 1994, is used to predict that a rear impact is about to occur, in which event, the headrest is moved proximate to the occupant.

The principal objects and advantages of this invention are:

1. To reduce whiplash injuries from rear impacts of a vehicle by automatically positioning the headrest proximate to the occupant's head.

2. To position a headrest proximate to the head of a vehicle occupant prior to a pending impact into the rear of a vehicle.

3. To provide a passive occupant protection system which is deployed in time to protect an occupant in a rear impact and resets without the need for repair or replacement of the system.

4. To provide a simple anticipatory sensor system for use with an adjustable headrest to predict a rear impact.

5. To provide an automatically adjusting system which conforms to the head and neck geometry of an occupant regardless of the occupant's particular morphology to properly support both the head and neck.

Other objects and advantages of this invention will become apparent from the disclosure which follows.

Briefly, the apparatus for determining the location of the head of the occupant in the presence of objects which obscure the head in accordance with the invention comprises transmitter means for illuminating a selective portion of the occupant and the head-obscuring objects in the vicinity of the head, sensor means for receiving illumination reflected from the occupant and the head-obscuring objects and generating a signal representative of the distance from the sensor means to the illuminated portion of the occupant and the head-obscuring objects, selective portion changing means for changing the illuminated portion of the occupant and the head-obscuring objects which is illuminated by the transmitter means and a processor. The processor comprises an algorithm for sequentially operating the selective portion changing means so as to illuminate different portions of the occupant and the head-obscuring objects, and pattern recognition means for determining the location of the head from the signals representative of the distance from the sensor means to the different selective portions of the occupant and the head-obscuring objects. The pattern recognition means may comprise a neural network.

In some embodiments of the invention, the head-obscuring objects comprise items from the class containing clothing and hair. The pattern recognition means may be arranged to determine the location of the approximate longitudinal location of the head from the headrest. If one or more airbags is mounted within the vehicle, the head location system may include means for determining the location of the head relative to the airbag. The transmitter means may comprise an ultrasonic transmitter arranged in the headrest and the sensor means may also be arranged in the headrest, possibly vertically spaced from the transmitter means. In the alternative, the transmitter means and sensor means may comprise a single transducer. The selective portion changing means may comprise a control module coupled to the transmitter means and the sensor means and servo motors for adjusting the position of the headrest.

The headrest in accordance with the invention comprises a frame attached to the seat, an airbag comprising a bag at least partially filled with air and surrounding at least a portion of the frame, maintaining means for maintaining the bag in a substantially pre-inflated condition prior to an impact of the headrest against the head of the occupant, supporting structure attached to the frame, enclosing the airbag and having means for constraining the motion of the airbag to a substantially fore and aft direction, and a cover substantially surrounding the airbag and elastically deformable in response to pressures from the airbag. When the head of the occupant is impacted by the headrest, air within the airbag flows substantially within the airbag to change the shape of the airbag so as to approximately conform to the head and neck of the occupant thereby providing a force on the head and neck of the occupant to substantially accelerate both the head and neck at substantially the same acceleration thereby minimizing whiplash injuries. The airbag may include a flow restriction in the airbag to permit the controlled flow of air out of the airbag during the impact of the headrest against the head to thereby dampen the impact of the head onto the headrest.

DETAILED DESCRIPTION OF THE PREFERRED EMBODIMENTS

Figure 1:
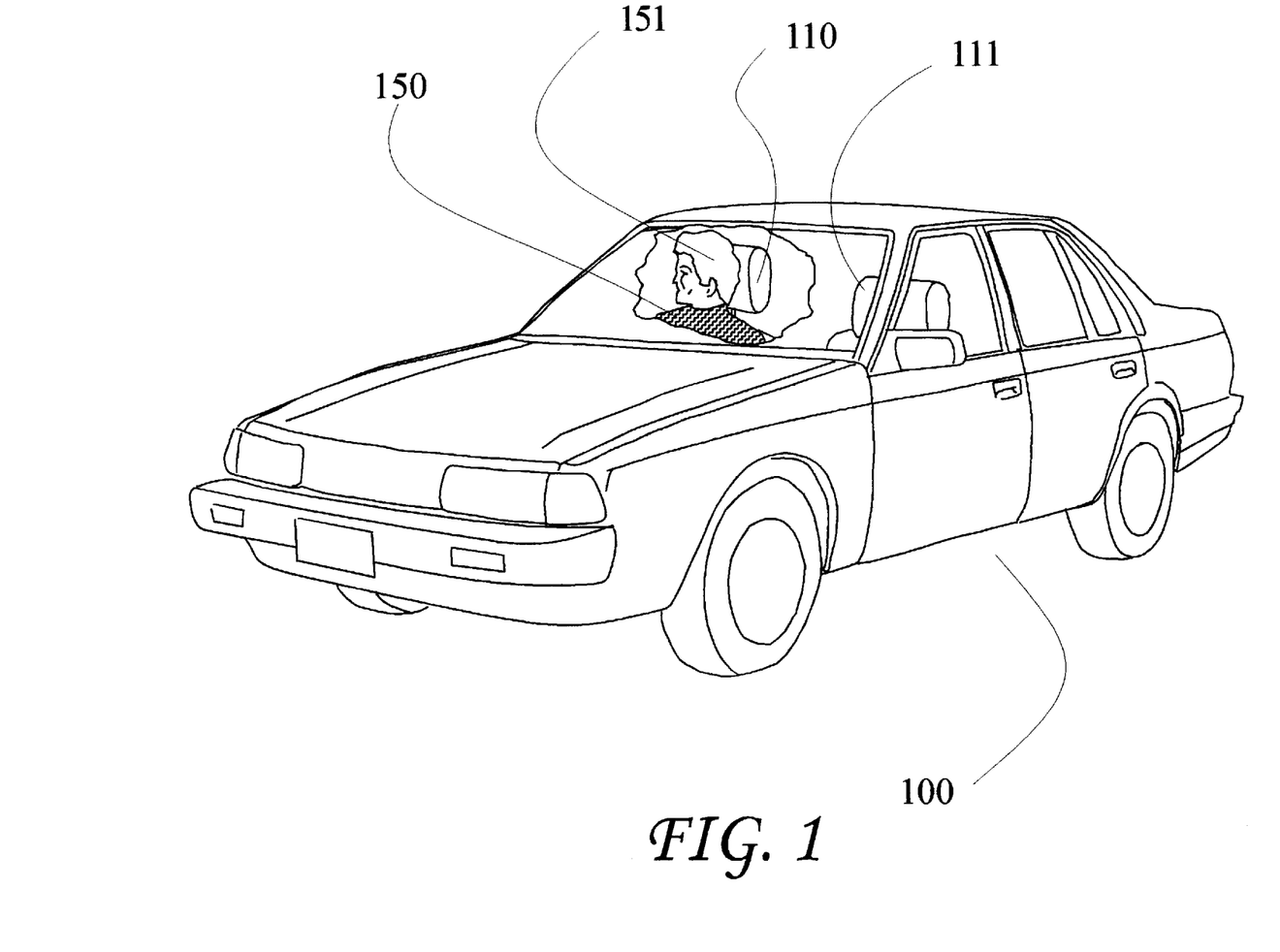
FIG. 1 is perspective view with portions cut away of a motor vehicle having a movable headrest and an occupant sitting on the seat with the headrest adjacent the head of the occupant to provide protection in rear impacts.

Referring to the accompanying drawings wherein like reference numerals refer to the same or similar elements, FIG. 1 is perspective view with portions cut away of a motor vehicle, shown generally at 100, having two movable headrests 110 and 111 and an occupant 150 sitting on the seat with the headrest 110 adjacent a head 151 of the occupant to provide protection in rear impacts.

Figure 2:
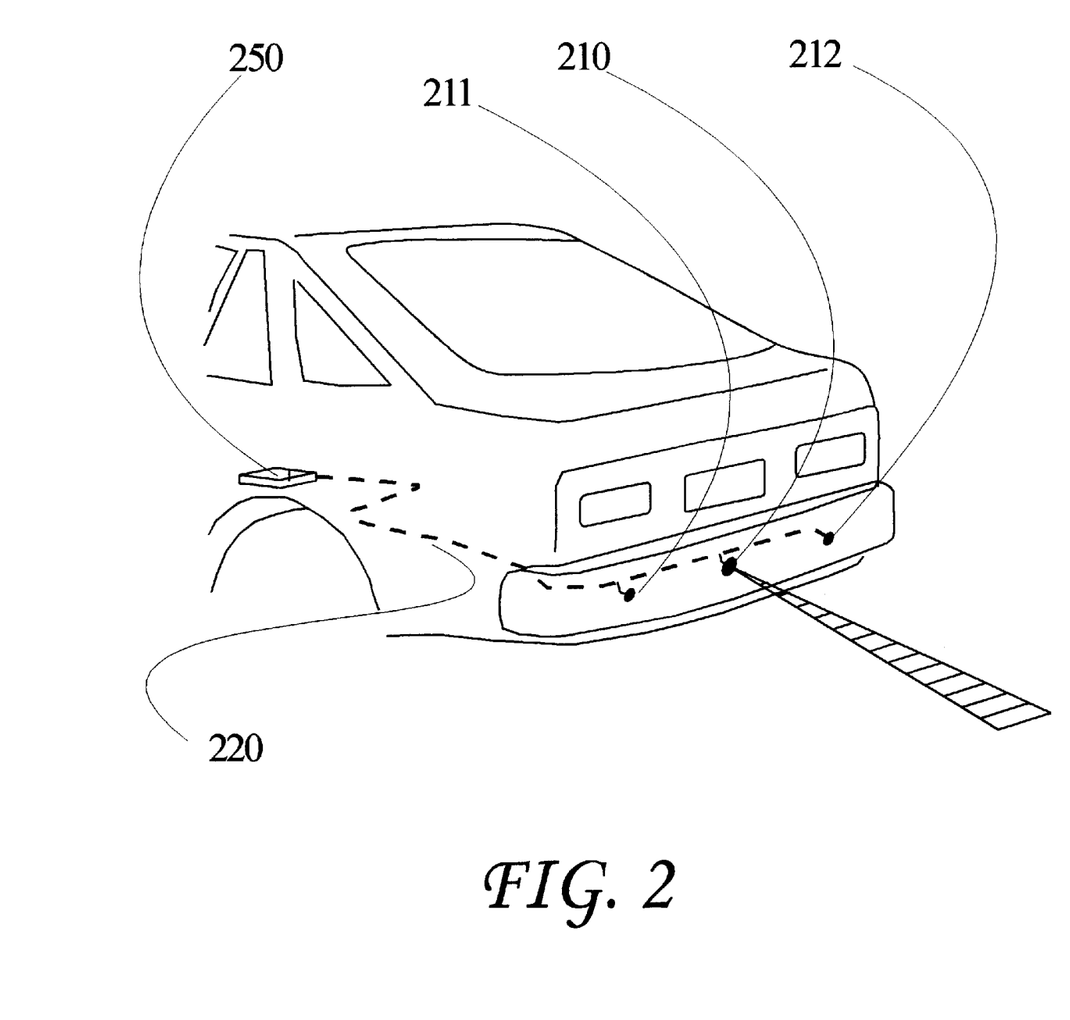
FIG. 2 is a perspective view of the rear portion of the vehicle shown in FIG. 1 showing a rear crash anticipatory sensor connected to an electronic circuit for controlling the position of the headrest in the event of a crash.

In FIG. 2 a perspective view of the rear portion of the vehicle shown in FIG. 1 is shown with a rear impact crash anticipatory sensor, comprising a transmitter 210 and two receivers 211 and 212, connected by appropriate electrical connections, e.g., wire 220, to an electronic circuit or control module 250 for controlling the position of the headrest in the event of a crash. In copending patent application Ser. No. 08/247,760 filed May 23, 1994 now abandoned, an anticipatory sensor system for side impacts is disclosed. This sensor system uses sophisticated pattern recognition technology to differentiate different categories of impacting vehicles. A side impact with a large truck at 20 mph is more severe than an impact with a motorcycle at 40 mph, and, since in that proposed airbag system the driver would no longer be able to control the vehicle, the airbag must not be deployed except in life threatening situations. Therefore, it is critical in order to predict the severity of a side impact, to know the type of impacting vehicle.

The situation is quite different in the case of rear impacts and the headrest system described herein. The movement of the headrest to the proximity of an occupant's head is not likely to affect his or her ability to control the automobile. Also, it is unlikely that anything but another car or truck will be approaching the rear of the vehicle at a velocity relative to the vehicle of greater than 8 mph, for example. The one exception is a motorcycle and it would not be serious if the headrest adjusted in that situation. Thus, a simple ranging sensor is all that is necessary. There are, of course, advantages in using a more sophisticated pattern recognition system as will be discussed below.

FIG. 2 therefore, illustrates a simple ranging sensor using an ultrasonic transmitter 210 and two ultrasonic receivers 211 and 212, although other types of wave generating transmitters and receivers could be used in accordance with the invention without deviating from the scope and spirit thereof. The ultrasonic transmitter 210 transmits ultrasonic waves. These transducers are connected to the electronic control module 250 by means of the wire 220. Naturally, other configurations might be equally or more advantageous. The sensors determine the distance of the approaching object and determine its velocity by differentiating the distance measurements or by use of the Doppler effect. Although an ultrasonic system is illustrated herein, radar, optical or other systems could also be used.

Although pattern recognition systems, such as neural nets, might not be required, such a system would be desirable. With pattern recognition, other opportunities become available such as the determination of the nature of objects behind the vehicle. This could be of aid in locating and recognizing objects, such as children, when vehicles are backing up and for other purposes. Although some degree of pattern recognition can be accomplished with the system illustrated in FIG. 2, especially if an optical system is used instead of the ultrasonic system illustrated, additional transducers significantly improve the accuracy of the pattern recognition systems if either ultrasonics or radar systems are used.

Figure 3:
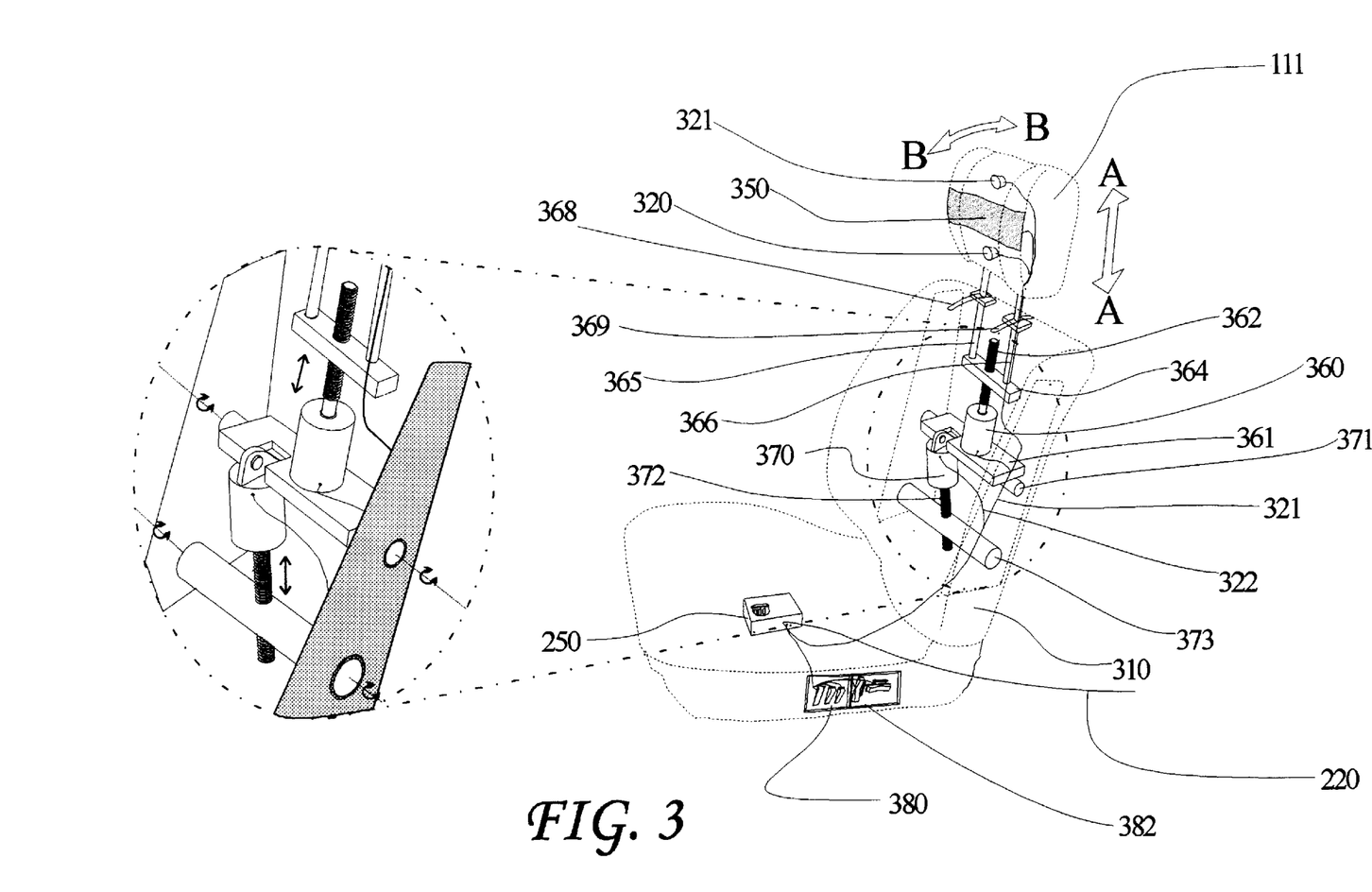
FIG. 3 is a perspective view of a headrest control mechanism mounted in a vehicle seat and ultrasonic head location sensors consisting of one transmitter and one receiver plus a head contact sensor, with the seat and headrest shown in phantom.

The wire 220 shown in FIG. 2 leads to the electronic control module 250 which is also shown in FIG. 3. FIG. 3 is a perspective view of a headrest actuation mechanism, mounted in a vehicle seat 310, and ultrasonic head location sensors consisting of one transmitter 320 and one receiver 321, plus a head contact sensor 350. The seat 310 and headrest 111 are shown in phantom. Vertical motion of the headrest 111 is accomplished when a signal is sent from control module 250 to servo motor 360 through wire 321. Servo motor 360 rotates lead screw 362 which mates with a threaded hole in elongate member 364 causing it to move up or down depending on the direction of rotation of the lead screw 362. Headrest support rods 365 and 366 are attached to member 364 and cause the headrest 111 to translate up or down with member 364. In this manner, the vertical position of the headrest can be controlled as depicted by arrow A—A.

Wire 322 leads from control module 250 to servo motor 370 which rotates lead screw 372. Lead screw 372 mates with a threaded hole in elongate, substantially cylindrical shaft 373 which is attached to supporting structures within the seat shown in phantom. The rotation of lead screw 372 rotates servo motor support 361 which in turn rotates headrest support rods 365 and 366 in slots 368 and 369 in the seat 310. In this manner, the headrest 111 is caused to move in the fore and aft direction as depicted by arrow B—B. Naturally there are other designs which accomplish the same effect in moving the headrest to where it is proximate to the occupant's head.

The operation of the system is as follows. When an occupant is seated on a seat containing the headrest and control system described above, the ultrasonic transmitter 320 emits ultrasonic energy which reflects off of the back of the head of the occupant and is received by receiver 321. An electronic circuit containing a microprocessor determines the distance from the head of the occupant based on the time period the transmission and reception of an ultrasonic pulse. The headrest 111 moves up and down until it finds the vertical position closest to the head of the occupant. The headrest remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in the longitudinal measurement. This problem is solved in an accident through the use of a contact sensor 350 on the surface of the headrest. When the headrest contacts a hard object, such as the rear of an occupant's head, the contract switch 350 closes and the motion of the headrest stops.

When a vehicle approaches the target vehicle, the target vehicle containing the headrest and control system of this invention, the time period between transmission and reception of ultrasonic waves, for example, shortens indicating that an object is approaching the target vehicle. By monitoring the distance between the target vehicle and the approaching vehicle, the approach velocity of the approaching vehicle can the calculated and a decision made by the circuitry in control module 250 that an impact above a threshold velocity is about to occur. The control module 250 then sends signals to servo motors 370 and 360 to move the headrest to where it contacts the occupant in time to support the occupant's head and neck and reduce or eliminate a potential whiplash injury as explained in more detailed below.

The seat also contains two switch assemblies 380 and 382 for controlling the position of the seat 380 and headrest 382. The headrest control switches 382 permit the occupant to adjust the position of the headrest in the event that the calculated position is uncomfortably close to or far from the occupant's head. A woman with a large hairdo might find that the headrest automatically adjusts so as to contact her hairdo. This might be annoying to the woman who could then position the headrest further from her head. For those vehicles which have a seat memory system for associating the seat position with a particular occupant, the position of the headrest relative to the occupant's head can also be recorded. Later when the occupant enters the vehicle, and the seat automatically adjusts to the occupant's recorded in memory preference, the headrest will similarly automatically adjust. In copending patent application Ser. No. 08/474,783 filed Jun. 7, 1995, included herein by reference, a method of passively recognizing a particular occupant is disclosed.

Thus, an automatically adjusting results which moves the headrest to each specific occupant's desired and memorized headrest position. The identification of the specific individual occupant for which memory look-up or the like would occur can be by height sensors, weight sensors (for example placed in a seat), or by pattern recognition means, or a combination of these and other means, as disclosed in the above referenced copending patent applications.

Figure 4:
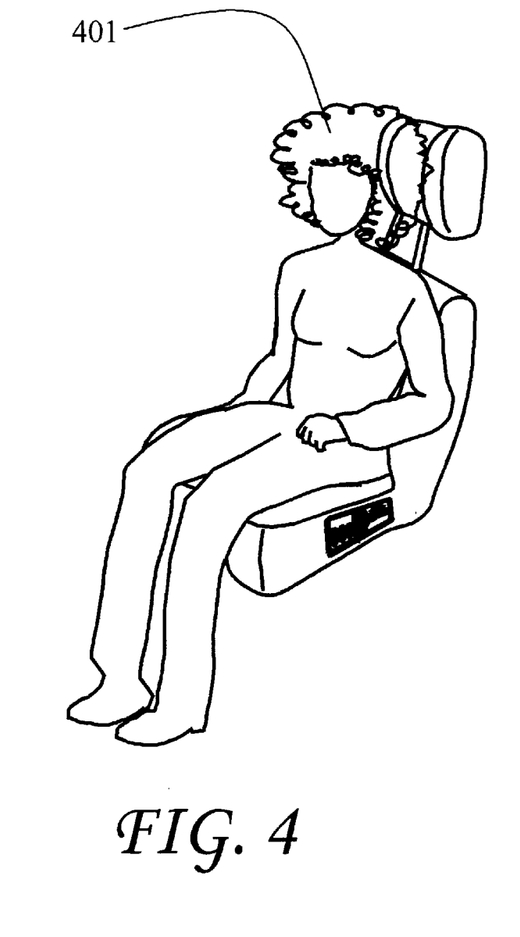
FIG. 4 is a perspective view of a female vehicle occupant having a large hairdo and also showing switches for manually adjusting the position of the headrest.
Figure 5:
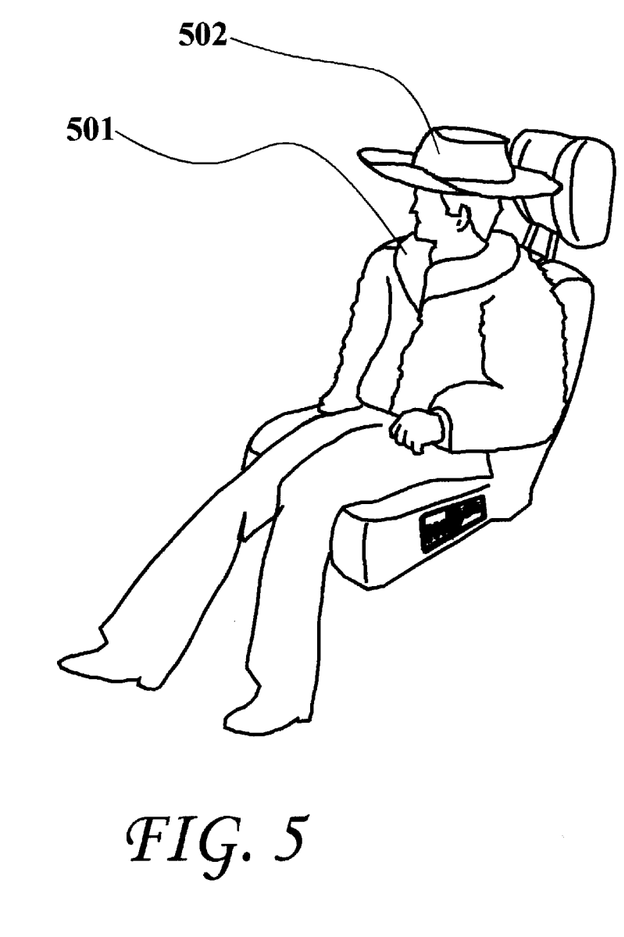
FIG. 5 is a perspective view of a male vehicle occupant wearing a winter coat and a large hat.

One advantage of this system is that it moves the headrest toward the occupant's head until it senses a resistance characteristic of an occupant's head. Thus, the system will not be fooled by a high coat collar 501 or hat 502, as illustrated in FIG. 5 or other article of clothing or by a large hairdo 401 as illustrated in FIG. 4, The headrest continues to be moved until it contacted something relatively rigid as determined by contact switch 350.

A key advantage of this system is that there is no permanent damage to the system when it deploys during an accident. After the event, it will reset without an expensive repair. In fact, it can be designed to reset automatically.

An ultrasonic sensor in the headrest has previously been proposed in a U.S. patent to locate the occupant for the out-of-position occupant problem. In that system, no mention is made as to how to find the head. In the headrest location system described herein, the headrest is moved up and down in response to the instant control systems to find the location of the back of the occupant's head. Once it has been found the same sensor is used to monitor the location of the person's head.

Figure 6:
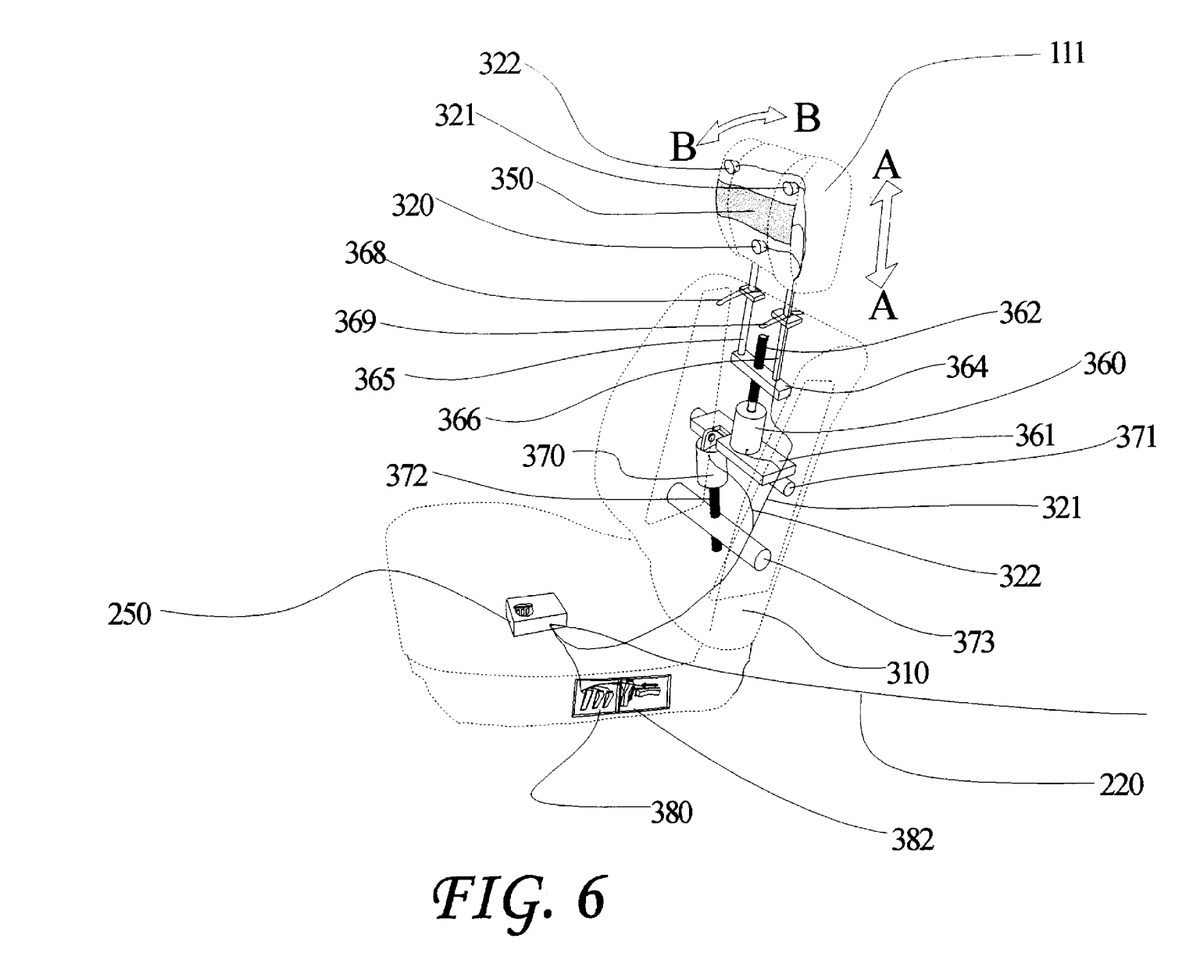
FIG. 6 is view similar to FIG. 3 showing an alternate design of a head sensor using one transmitter and three receivers for use with a pattern recognition system.

An improvement to the system described above results when pattern recognition technology is added. FIG. 6 is view similar to FIG. 3 showing an alternate design of a head sensor using one transmitter 320 and three receivers 320, 321 and 322 for use with a pattern recognition system. Transducer 320 performs both as a transmitter and receiver. Receivers 321, 322 are placed on either side of transducer 320 and above the same. Using this system and an artificial neural network, or other pattern recognition system, as part of the electronic control module 250, an accurate determination of the location of an occupant's head can, in most cases, be accomplished even when the occupant has a large hairdo or hat. In this case, the system would be trained for a wide variety of different cases prior to installation into the vehicle. This training is accomplished by placing a large variety of different occupants onto the driver's seat in a variety of different positions and recording digitized data from receivers 320, 321 and 322 along with data representing the actual location of the occupant's head. The different occupants include examples of large and small people, men and women, with many hair, hat, and clothing styles. Since each of these occupants is placed at a variety of different positions on the seat, the total data set, called the "training set", will consist of at least one thousand cases. This training set is then used to train the neural network, or other similar trainable pattern recognition technology, so that the resulting network can locate the occupant's head in the presence of the types of obstructions discussed above whatever an occupant occupies the driver's seat.

Figure 7:
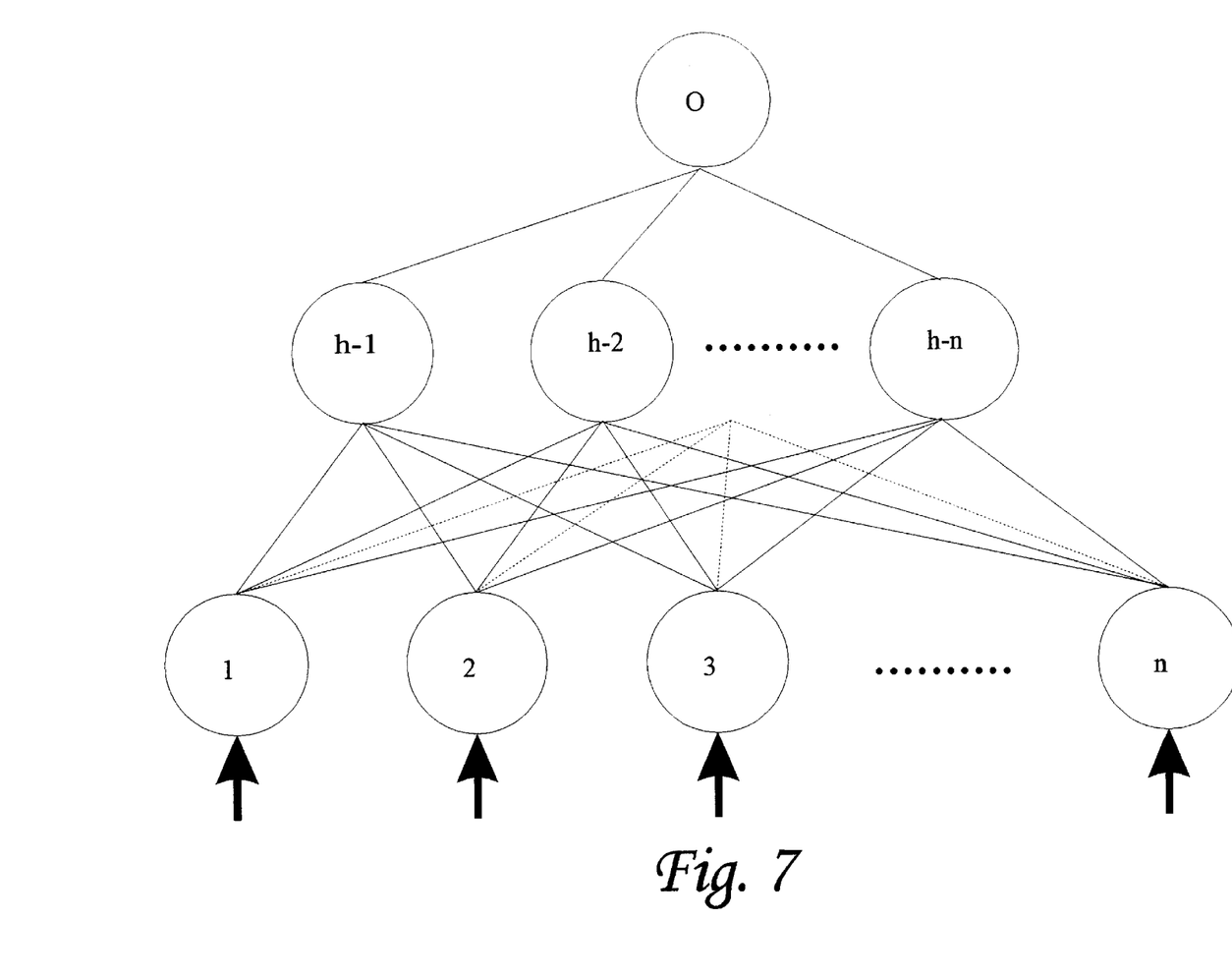
FIG. 7 is a schematic view of an artificial neural network pattern recognition system of the type used to recognize an occupant's head.

FIG. 7 is a schematic view of an artificial neural network of the type used to recognize an occupant's head. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge, Mass., 1990; and, *Digital Neural Networks*, by Kung, S. Y., PTR Prentice Hall, Englewood Cliffs, N.J., 1993. The neural network is presented here as an example of a pattern recognition technology. Other pattern recognition algorithms are being developed which, in some cases, have superior performance to neural networks.

The process of locating the head of an occupant can be programmed to begin when an event occurs such as the closing of a vehicle door or the shifting of the transmission out of the PARK position. The ultrasonic transmitter/receiver 320 transmits a train of ultrasonic waves toward the head of the occupant. Waves reflected from the occupant's head are received by transducers 320, 321 and 322. An electronic circuit containing an analog to digital converter converts the received analog signal to a digital signal which is fed into the input nodes numbered 1, 2, 3, . . . n, shown on FIG. 7. The neural network algorithm compares the pattern of values on nodes 1 through N with patterns for which it has been trained, as discussed above. Each of the input nodes is connected to each of the second layer nodes, called the hidden layer, either electrically as in the case of a neural computer or through mathematical functions containing multiplying coefficients called weights, described in more detail below. The weights are determined during the training phase while creating the neural network as described in detail in the above text references. At each hidden layer node a summation occurs of the values from each of the input layer nodes, which have been operated on by functions containing the weights, to create a node value.

The hidden layer nodes are in like manner connected to the output layer nodes, which in this example is only a single node representing the longitudinal distance to the back of the occupant's head. During the training phase, the distance to the occupant's head for a large variety of patterns is taught to the system. These patterns include cases where the occupant is wearing a hat, has a high collar, or a large hairdo, as discussed above, where a measurement of the distance to the back of the occupant's head cannot be directly measured. When the neural network recognizes a pattern similar to one for which it has been trained, it then knows the distance to the occupant's head. The details of this process are described in the above listed referenced texts and will not be presented in detail here. The neural network pattern recognition system described herein is one of a variety of pattern recognition technologies which are based on training. The neural network is presented herein as one example of the class of technologies referred to as pattern recognition technologies.

A time step, such as one tenth of a millisecond, is chosen as the period at which the analog to digital converter (ADC) averages the output from the ultrasonic receivers and feeds data to the input nodes. For one preferred embodiment of this invention, a total of one hundred input nodes is typically used representing ten milliseconds of received data. The input to each input node is a preprocessed combination of the data from the three receivers. In another implementation, separate input nodes would be used for each transducer. Alternately, the input data to the nodes can be the result of a preprocessing algorithm which combines the data taking into account the phase relationships of the three return signals to obtain a map or image of the surface of the head using the principles of phased array radar. Although a system using one transmitter and three receivers is discussed herein, where one transducer functions as both a transmitter and receiver, even greater resolution can be obtained if all three receivers also act as transmitters.

In the example above, one hundred input nodes, twelve hidden layer nodes and one output layer node are typically used. In this example received data from only three receivers were considered. If data from additional receivers is also available the number of input layer nodes could increase depending on the preprocessing algorithm used. If the same neural network is to be used for sensing rear impacts, one or more additional output nodes might be used, one for each decision. The theory for determining the complexity of a neural network for a particular application has been the subject of many technical papers as well as in the texts referenced above and will not be presented in detail here. Determining the requisite complexity for the example presented here can be accomplished by those skilled in the art of neural network design and is discussed briefly below.

The pattern recognition system described above defines a method of determining the probable location of the rear of the head of an occupant and, will therefore determine, if used in conjunction with the anticipatory rear impact sensor, where to position a deployable occupant protection device in a rear collision, and comprises the steps of:

(a) obtaining an ultrasonic, analog signal from transducers mounted in the headrest;

(b) converting the analog signal into a digital time series;

(c) entering the digital time series data into a pattern recognition system such as a neural network;

(d) performing a mathematical operation on the time series data to determine if the pattern as represented by the time series data is nearly the same as one for which the system has been trained; and (e) calculating the probable location of the occupant's head if the pattern is recognizable.

The particular neural network described and illustrated above contains a single series of hidden layer nodes. In some network designs, more than one hidden layer is used although only rarely will more than two such layers appear. There are of course many other variations of the neural network architecture illustrated above, as well as other pattern recognition systems, which appear in the literature. For the purposes herein, therefore, "neural network" will be defined as a system wherein the data to be processed is separated into discrete values which are then operated on and combined in at least a two stage process and where the operation performed on the data at each stage is in general different for each of the discrete values and where the operation performed is at least determined through a training process. The operation performed is typically a multiplication by a particular coefficient or weight and by different operation, therefore is this example, a different weight is used for each discrete value.

The implementation of neural networks can take at least two forms, an algorithm programmed on a digital microprocessor or in a neural computer. Neural computer chips are just now becoming available and are beyond the price range of commercially acceptable head sensing applications at this time, however, the prices are expected to drop soon.

In the particular implementation described above, the neural network is typically trained using data from 1000 different combinations of people, clothes, wigs etc. There are, of course, other situations which have not been tested. As these are discovered, additional training will improve the performance of the pattern recognition head locator.

Once a pattern recognition system is implemented in a vehicle, the same system can be used for many other pattern recognition functions as described in the above referenced copending patent applications. For example, in U.S. patent application Ser. No. 08/239,978 referenced above, the use of neural networks as a preferred pattern recognition technology is disclosed for use in identifying a rear facing child seat located on the front passenger seat of an automobile. This same patent application also discloses many other applications of pattern recognition technologies for use in conjunction with monitoring the interior of an automobile passenger compartment.

As described in the above referenced patents to Dellanno et al, whiplash injuries typically occur when there is either no head support or when only the head of the occupant is supported during a rear impact. To minimize these injuries, both the head and neck should be supported. In Dellanno, the head and neck are supported through a pivoting headrest which first contacts the head of the occupant and then rotates to simultaneously support both the head and the neck. The force exerted by the head and neck onto the pivoting headrest is distributed based on the relative masses of the head and neck. Dellanno assumes that the ratio of these masses is substantially the same for all occupants and that the distances between centers of mass of the head and neck is approximately also proportional for all occupants. To the extent that this is not true, a torque will be applied to the headrest and cause a corresponding torque to be applied to the head and neck of the occupant. Ideally the head and neck would be supported with just the required force to counteract the inertial force of each item. Obviously this can only approximately be accomplished with the Dellanno pivoting headrest especially when one considers that no attempt has been made to locate the headrest relative to the occupant and the proper headrest position will vary from occupant to occupant. Dellanno also assumes that the head and neck will impact and in fact bounce off of the headrest. A far more significant improvement to eliminating whiplash injuries can be accomplished by eliminating this head impact and the resulting rebound as is accomplished in the present invention.

Automobile engineers attempt to design vehicle structures so that in an impact the vehicle is accelerated at an approximately constant acceleration. It can be shown that this results in the most efficient use of the vehicle structure in absorbing the crash energy. It also minimizes the damage to the vehicle in a crash and thus the cost of repair. Let us assume, therefore, that in a particular rear impact that the vehicle accelerates at a constant 15 g acceleration. Let us also assume that the vehicle seat back is rigidly attached to the vehicle structure at least during the early part of the crash, so that up until shortly after the occupant's head has impacted the headrest the seat back also is accelerating at a constant 15 g's. Finally let us assume that the occupant's head is initially displaced 4 inches from the headrest and that during impact the head compresses the headrest 1 inch. When the occupant's head impacts the headrest it must now make up for the difference in velocity between the headrest and the head during the period that it is compressing the headrest 1 inch. It can be demonstrated that this requires an acceleration of 75 g's or five times the acceleration which the head would experience if it were in contact with the headrest at the time that the rear impact occurs.

Figure 8:
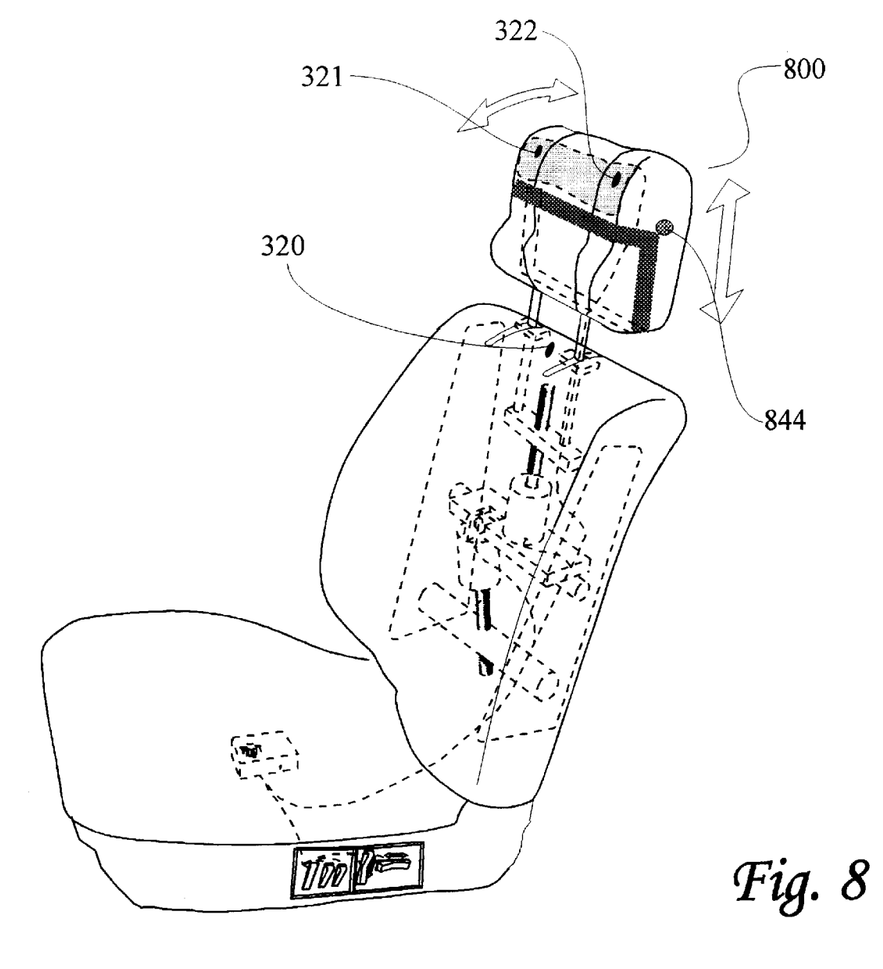
FIG. 8 is a perspective view of an of automatically adjusting head and neck supporting headrest.

The Dellanno headrest, as shown for example in FIG. 3 of U.S. Pat. No. 5,290,091, is a worthwhile addition to solving the whiplash problem after the headrest has been positioned against the head and neck of the occupant. The added value of the Dellanno design over simpler designs, especially considering the inertial effects of having to rapidly rotate the headrest while the crash is taking place, is probably not justified. FIG. 8 illustrates a headrest design which accomplishes the objectives of the Dellanno headrest in a far simpler structure and at less potential injury to the occupant.

In FIG. 8, a seat with a movable headrest similar to the one illustrated in FIG. 3 is shown with a headrest designated 800 designed to provide support to both the head and neck which eliminates the shortcomings of the Dellanno headrest. The ultrasonic transducer 320, which includes both a transmitter and receiver, has been moved to an upper portion of the seat back, not the headrest, to facilitate the operation of the support system as described below. The construction of the headrest is illustrated in a cutaway view shown in FIG. 8A which is an enlarged view of the headrest of FIG. 8.

Figure 8A:
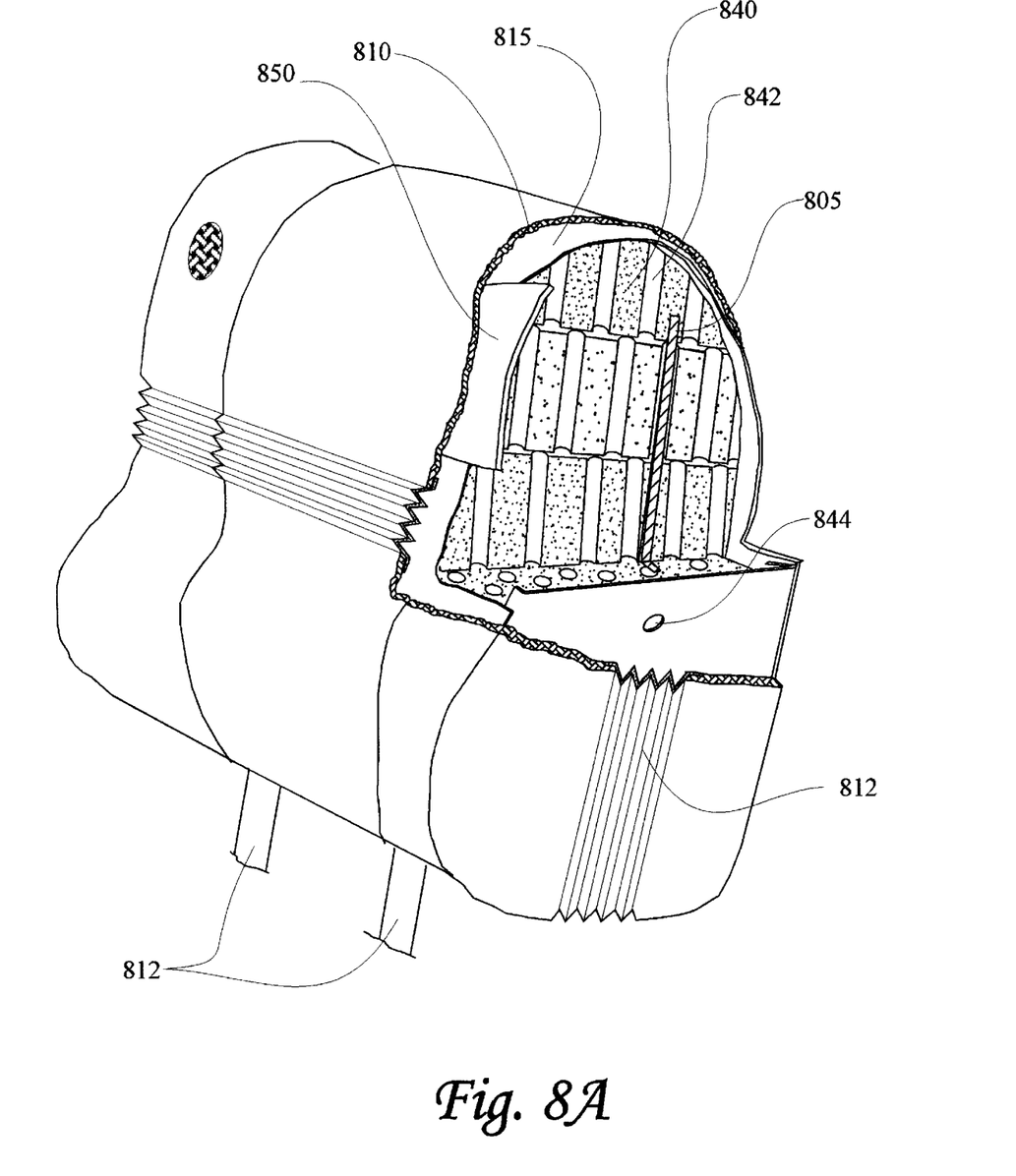
FIG. 8A is a perspective view with portions cutaway and removed of the headrest of FIG. 8.

In FIG. 8A, the headrest is constructed of a support 805 which is attached to rods 812 and extends along the sides and across the back of the headrest. Support 805 may be made of a somewhat rigid material. This support 805 helps control the motion of the airbag as it deforms under the force from the head of the occupant to where it contacts and provides support to the occupant's neck. Relatively low density open cell foam 840 surrounds the support 805 giving shape to the remainder of the headrest. The foam 840 is covered by a thin membrane, possibly made from plastic, or a bag 815, and by a decorative cover 810 made of any suitable, acceptable material. The bag 815 is sealed surrounding the support 805 and plastic foam 840 such that any flow of air into or out of the bag 815 is through a hole in the bag adjacent to hole 844 in the supporting structure, i.e., the cover 810. Elastic stretch seams 812 are placed in the sides, bottom and across the front of the headrest cover to permit the headrest surface to deform to the contour of, and to properly support, the occupant's head and neck. A contact switch 850 is placed just inside cover 810 and functions as described above.

Figure 9A:
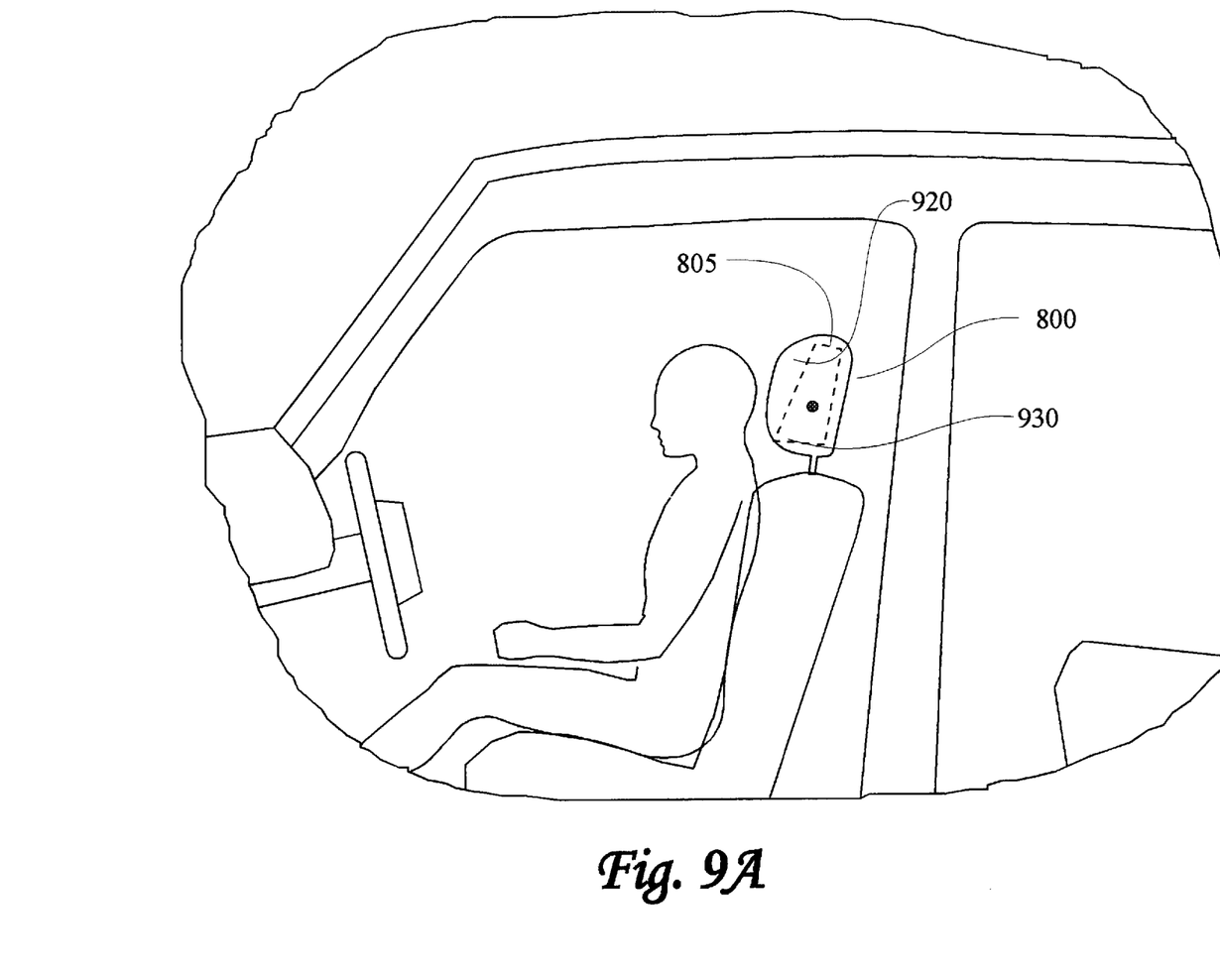
FIG. 9A is a side view of an occupant seated in the driver seat of an automobile with the headrest in the normal position.
Figure 9B:
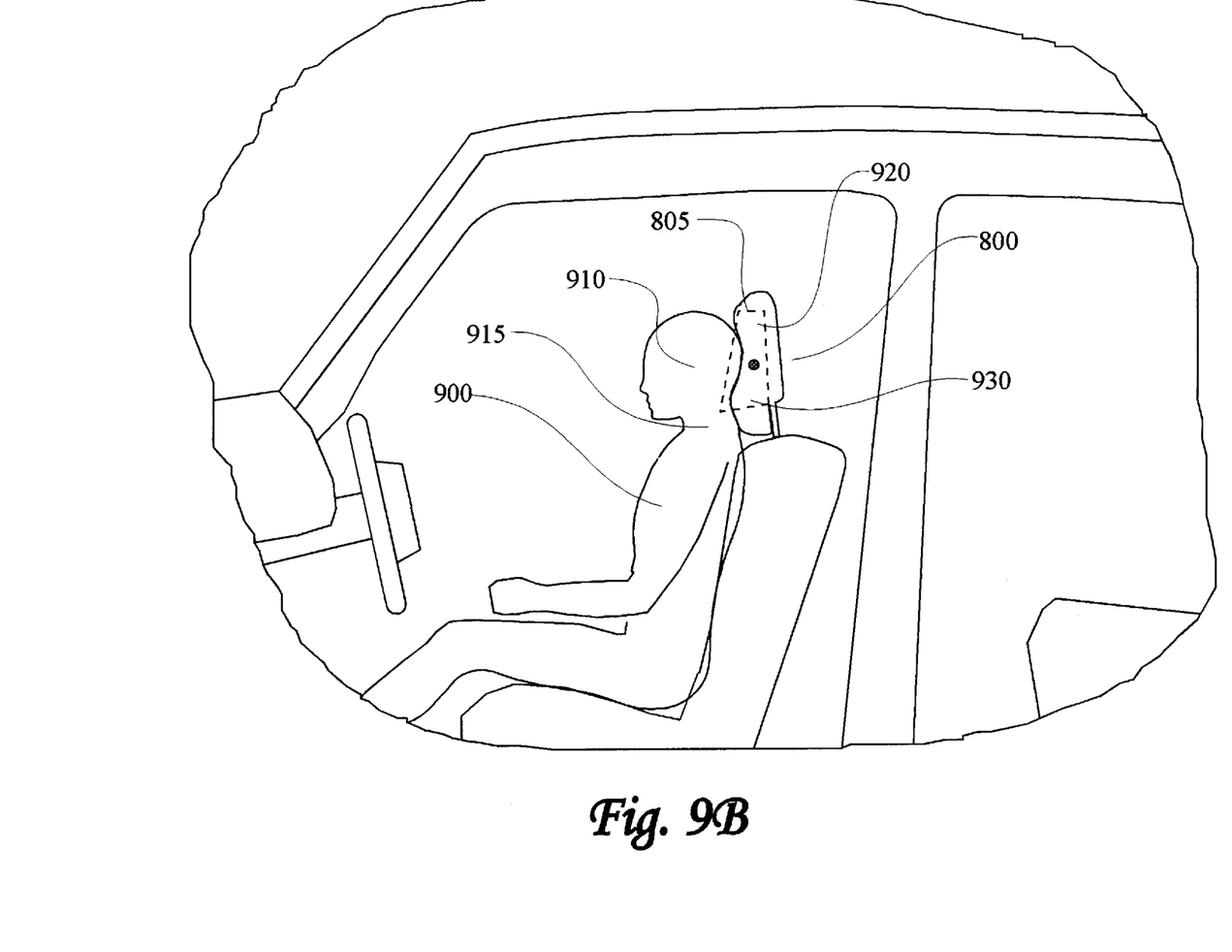
FIG. 9B is a view as in FIG. 9A with the headrest in the had contact position as would happen in anticipation of a rear crash.

FIG. 9A and FIG. 9B illustrated the operation of the headrest 800. In anticipation of a rear impact, as determined by the proximity sensors described above, headrest 800 moves from its position has shown in FIG. 9A to its position as shown in FIG. 9B. When headrest 800 contacts the head 910 of the occupant 900, it exerts sufficient pressure against head 910 to cause air to flow from the upper portion 920 to the lower portion 930 of headrest 800, which causes this lower portion to expand as the upper portion contracts. This initial flow of air takes place as the foam 840 compresses under the force of contact between the head and upper portion 920 of headrest 800. The initial shape of headrest 800 is created by the shape of the foam 840; however, once the occupants head 910 begins to exert pressure on the upper portion 920, the air is compressed and begins to flow to the lower portion 930 causing it to expand until it contacts the neck 915 of the occupant 900. In this matter, by the flow of air, the pressure is equalize on the head and neck of the occupant 900 thereby preventing the whiplash type motions described in the Dellanno patents, as well as numerous technical papers on the subject. The headrest of this invention acts very much like a pre-inflated airbag providing force where force is needed to counteract the accelerations of the occupant. It accomplishes this force balancing without the need to rotate a heavy object such as the headrest in the Dellanno patent which by itself could introduce injuries to the occupant.

A headrest using a pre-inflated airbag type structure composed of many small airbags is disclosed in FIG. 9 of U.S. Pat. No. 5,098,124 to Breed et al which is included herein by reference. The headrest disclosed here differs primarily through the use of a single pre-inflated airbag which when impacted by the head of the occupant, deforms by displacing the surface of the headrest outwardly to capture and support the neck of the occupant. The use of an airbag to prevent whiplash injuries is common for accidents involving frontal impacts and driver and passenger side airbags. Whiplash injuries have not become an issue in frontal impacts involving airbags, therefore, the ability of airbags to prevent whiplash injuries in frontal impacts is proven. The use of airbags to prevent whiplash injuries in rear impacts is therefore appropriate and, if a pre-inflated airbag as described herein is used, results in a simple low-cost and effective headrest design.

This pre-inflated airbag headrest has another feature which further improves its performance. The vent hole 844 is provided to permit some of the air in the headrest to escape in a controlled manner thereby dampening the motion of the head and neck much in the same way that a driver side airbag has vent holes to dissipate the energy of the impacting driver during a crash. Appropriate regulation means may also be associated with the vent hole 844 of the headrest 800 to regulate the escaping air. Without the vent hole, there is risk that the occupant's head and neck will rebound off of the headrest as is also a problem in the Dellanno patents. This can happen especially when, due to pre-crash braking or an initial frontal impact such as occurs in a multiple car accident, the occupant is sufficiently out of position that the headrest cannot reach his or her head before the rear impact. Without this feature the acceleration on the head will necessarily be greater and therefore the opportunity for injury to the neck is increased. The size of this hole is determined experimentally or by mathematical analysis and computer simulation. If it is too large, too much air will escape and the headrest will bottom out on the support. If it is too small, the head will rebound off of the headrest thereby increasing the chance of whiplash injury. Naturally, a region of controlled porosity could be substituted for hole 844.

Finally, a side benefit of this invention is that it can be used to determine the presence of an occupant on the front passenger seat. This information can then be used to suppress deployment of an airbag if the seat is unoccupied.

Thus there is disclosed and illustrated herein a passive rear impact protection system which requires no action by the occupant and yet protects the occupant from whiplash injuries caused by rear impacts. Although several preferred embodiments are illustrated and described above there are possible combinations using other geometry, material, and different dimensions of the components that can perform the same function. Therefore, this invention is not limited to the above embodiments and should be determine by the following claims. In particular, although the particular rear impact occupant protection system described in detail above requires all of the improvements described herein to meet the goals and objectives of this invention, some of these improvements may not be used in some applications.

What is claimed is:

1. In a motor vehicle having a front, a rear, a passenger compartment and a seat having a movable headrest and on which an occupant sits, apparatus for determining the location of the head of the occupant in the presence of objects which obscure the head comprising:
   (a) transmitter means for illuminating a selective portion of the occupant and the head-obscuring objects in the vicinity of the head;
   (b) sensor means for receiving illumination reflected from the occupant and the head-obscuring objects, said sensor means being structured and arranged to generate a signal representative of the distance from said sensor means to said illuminated portion of the occupant and the head-obscuring objects;
   (c) selective portion changing means for changing said illuminated portion of the occupant and the head-obscuring objects which is illuminated by said transmitter means; and
   (d) a processor comprising:
      (i) means for sequentially operating said selective portion changing means so as to illuminate different portions of the occupant and the head-obscuring objects; and
      (ii) pattern recognition means for determining the location of the head from said signals representative of the distance from said sensor means to said different selective portions of the occupant and the head-obscuring objects.

2. The invention in accordance with claim 1, wherein said pattern recognition means comprises a neural network.

3. The invention in accordance with claim 1, wherein the head-obscuring objects comprises items from the class containing clothing and hair.

4. The invention in accordance with claim 1, wherein said pattern recognition means are structured and arranged to determine the location of the approximate longitudinal location of the head from said headrest.

5. The invention in accordance with claim 1, wherein at least one airbag is mounted within said vehicle and said head location determining apparatus further comprises means for determining the location of said head relative to said at least one airbag.

6. The invention in accordance with claim 1, wherein said transmitter means comprise an ultrasonic transmitter arranged in said headrest.

7. The invention in accordance with claim 1, wherein said sensor means are arranged in said headrest.

8. The invention in accordance with claim 1, wherein said transmitter means and said sensor means comprise a single transducer.

9. The invention in accordance with claim 1, wherein said transmitter means and said sensor means are arranged in said headrest and vertically spaced from one another.

10. The invention in accordance with claim 1, wherein said sensor means comprise a plurality of sensors arranged in said headrest.

11. The invention in accordance with claim 9, wherein said selective portion changing means comprise a control module coupled to said transmitter means and said sensor means and servo motors for adjusting the position of said headrest.

12. The invention in accordance with claim 1, wherein said means for sequentially operating said selective portion changing means comprise an algorithm.

13. The invention in accordance with claim 1, wherein the headrest comprises a frame attached to the seat;

an airbag at least partially filled with air and surrounding at least a portion of said frame;

maintaining means for maintaining said airbag in a substantially pre-inflated condition prior to an impact of the headrest against the head of the occupant;

supporting structure attached to said frame and enclosing said airbag; and a cover substantially surrounding said airbag.

14. The invention in accordance with claim 13, wherein when the head of the occupant is impacted by said headrest, air within said airbag flows substantially within said airbag to change the shape of said airbag so as to approximately conform to the head and neck of said occupant thereby providing a force on the head and neck of the occupant to substantially accelerate both the head and neck at substantially the same acceleration thereby minimizing whiplash injuries.

15. The invention in accordance with claim 13, wherein the headrest further comprises a flow restriction in said airbag to permit the controlled flow of air out of said airbag during said impact of the headrest against the head to thereby dampen the impact of the head onto the headrest.

16. The invention in accordance with claim 13, wherein said supporting structure has means for constraining the motion of said airbag to a substantially fore and aft direction.

17. The invention in accordance with claim 13, wherein said cover is elastically deformable in response to pressures from said airbag.

18. An apparatus for determining the location of a head of an occupant of a vehicle in the presence of objects which obscure the head, comprising:

(a) transmitter means for illuminating a selective portion of the occupant and the head-obscuring objects in the vicinity of the head;

(b) sensor means for receiving illumination reflected from the occupant and the head-obscuring objects, said sensor means being structured and arranged to generate a signal representative of the distance from said sensor means to said illuminated portion of the occupant and the head-obscuring objects;

(c.) selective portion changing means for changing said illuminated portion of the occupant and the head-obscuring objects which is illuminated by said transmitter means; and (d) a processor comprising:

(i) means for sequentially operating said selective portion changing means so as to illuminate different portions of the occupant and the head-obscuring objects, and (ii) pattern recognition means for determining the location of the head from said signals representative of the distance from said sensor means to said different selective portions of the occupant and the head-obscuring objects.

19. In a motor vehicle having a front, a rear, a passenger compartment and a seat having a movable headrest and on which an occupant sits, an apparatus for determining the location of the head of the occupant in the presence of objects which obscure the head comprising:

(a) a transmitter for illuminating a selective portion of the occupant and the head-obscuring objects in the vicinity of the head, said illuminated portion of the occupant and the head-obscuring objects which is illuminated by said transmitter being varied;

(b) a sensor for receiving illumination reflected from the occupant and the head-obscuring objects, said sensor being structured and arranged to generate a signal representative of the distance from said sensor to said illuminated portion of the occupant and the head-obscuring objects;

(c.) a processor for controlling the variation in said illuminated portion of the occupant and the head-obscuring objects which is illuminated by said transmitter so as to illuminate different portions of the occupant and the head-obscuring objects, said processor comprising pattern recognition means for determining the location of the head from said signals representative of the distance from said sensor to the various selective portions of the occupant and the head-obscuring objects.

* * * * *